United States Patent [19]

Yoshinaga et al.

[11] Patent Number: 4,590,908

[45] Date of Patent: May 27, 1986

[54] FUEL AMOUNT CONTROL SYSTEM IN AN INTERNAL COMBUSTION ENGINE

[75] Inventors: Toru Yoshinaga, Okazaki; Yasuyuki Sakakibara, Nishio; Seiko Abe, Okazaki; Kazuhide Watanabe, Toyohashi; Yukihiro Natsuyama, Okazaki, all of Japan

[73] Assignee: Nippon Soken, Inc., Nishio, Japan

[21] Appl. No.: 667,344

[22] Filed: Nov. 1, 1984

[30] Foreign Application Priority Data

Nov. 2, 1983 [JP] Japan ................................ 58-204950

[51] Int. Cl.⁴ ................................ F02M 59/00

[52] U.S. Cl. ................................ 123/357; 123/500

[58] Field of Search ............... 123/500, 501, 458, 460, 123/357, 480, 490, 494

[56] References Cited

U.S. PATENT DOCUMENTS

| | | | |
|---|---|---|---|
| 3,820,198 | 6/1974 | Scofield | 123/490 |
| 3,982,505 | 9/1976 | Rivere | 123/490 |
| 4,092,717 | 5/1978 | DiNunzio | 123/490 |
| 4,140,084 | 2/1979 | DiNunzio | 123/490 |
| 4,402,294 | 9/1983 | McHugh | 123/494 |
| 4,475,513 | 10/1984 | Flaig | 123/460 |
| 4,480,619 | 11/1984 | Igashira et al. | 123/480 |
| 4,491,111 | 1/1985 | Eheim | 123/458 |
| 4,505,240 | 3/1985 | Shinova | 123/458 |

*Primary Examiner*—Ronald B. Cox

*Attorney, Agent, or Firm*—Cushman, Darby & Cushman

[57] ABSTRACT

A system for control of the amount of fuel to be injected in an internal combustion engine uses a high-pressure pump and a fuel control valve mechanism for spill having an electromagnetic valve and an oil-pressure valve. A predetermined delay time is added to the control timing of the current supply to the fuel control valve mechanism for spill, thus achieving the injection of the required amount of fuel at the most appropriate timing.

4 Claims, 11 Drawing Figures

FUEL AMOUNT CONTROL SYSTEM IN AN INTERNAL COMBUSTION ENGINE

BACKGROUND ART

1. Field of the Invention

The present invention relates to a system for the control of the amount of fuel to be injected in an internal combustion engine. The system according to the present invention is applicable to a diesel engine for an automotive vehicle having a spill mechanism acting to stop the fuel supply to the fuel injection nozzle in the engine.

2. Description of the Prior Art

In general, where a conventional VE type fuel injection pump is used as a fuel injection pump in an internal combustion engine for an automotive vehicle, the start of fuel injection is decided by a timer in the VE pump. The termination of fuel injection is decided by the detection of a reference signal and a phase signal by sensors in the VE pump, and a spill start signal from a computer is supplied to an electromagnetic valve.

In engines having the above-described fuel amount control system, a problem exists in that, when there are variations in the response characteristic of the electromagnetic valve, the characteristic of the fuel injection amount is also subject to variation. It has been confirmed by the present inventors that the response characteristic of an electromagnetic valve is such that an approximately constant time delay occurs in each of the electromagnetic valves regardless of the engine rotational speed or the fuel injection amount.

Also, when the above-described fuel amount control system is used for an engine having multiple cylinders, if the spill start signals for the engine cylinders are delivered at the same angle, the fuel injection amount is subject to variation due to the phase shift of a face cam of the VE pump. It has been confirmed by the present inventors that an approximately constant time delay occurs in each of the cylinders regardless of the engine rotational speed or the fuel injection amount.

SUMMARY OF THE INVENTION

It is the object of the present invention to provide an improved system for the control of the amount of fuel to be injected in an internal combustion engine using a fuel amount control device in which the correction of variations in the operation characteristics of the electromagnetic valves and the engine cylinders is carried out in a relatively simple manner, and hence, the control of the amount of fuel to be injected in the internal combustion engine is most appropriately achieved.

According to the fundamental aspect of the present invention there is provided a system for control of the amount of fuel to be injected in an internal combustion engine using a fuel amount control device including a high-pressure pump and a fuel control valve mechanism for spill having an electromagnetic valve and an oil-pressure valve. Wherein, the current supply to the electromagnetic valve is controlled, and a predetermined delay time is added to the control timing of the current supply to the fuel control valve mechanism for spill.

According to another aspect of the present invention there is provided a system for control of the amount of fuel to be injected in an internal combustion engine using a fuel amount control device including a high-pressure pump having a distribution function for multiple cylinders and a fuel control valve mechanism for spill having an electromagnetic valve and an oil-pressure valve. Wherein, the current supply to the electromagnetic valve is under control, and a predetermined delay time is added to the control timing of the current supply to the fuel control valve mechanism for spill, and a predetermined delay angle is added to the control timing of the current supply to the fuel control valve mechanism for spill.

DESCRIPTION OF THE PREFERRED EMBODIMENTS

Figure 1:
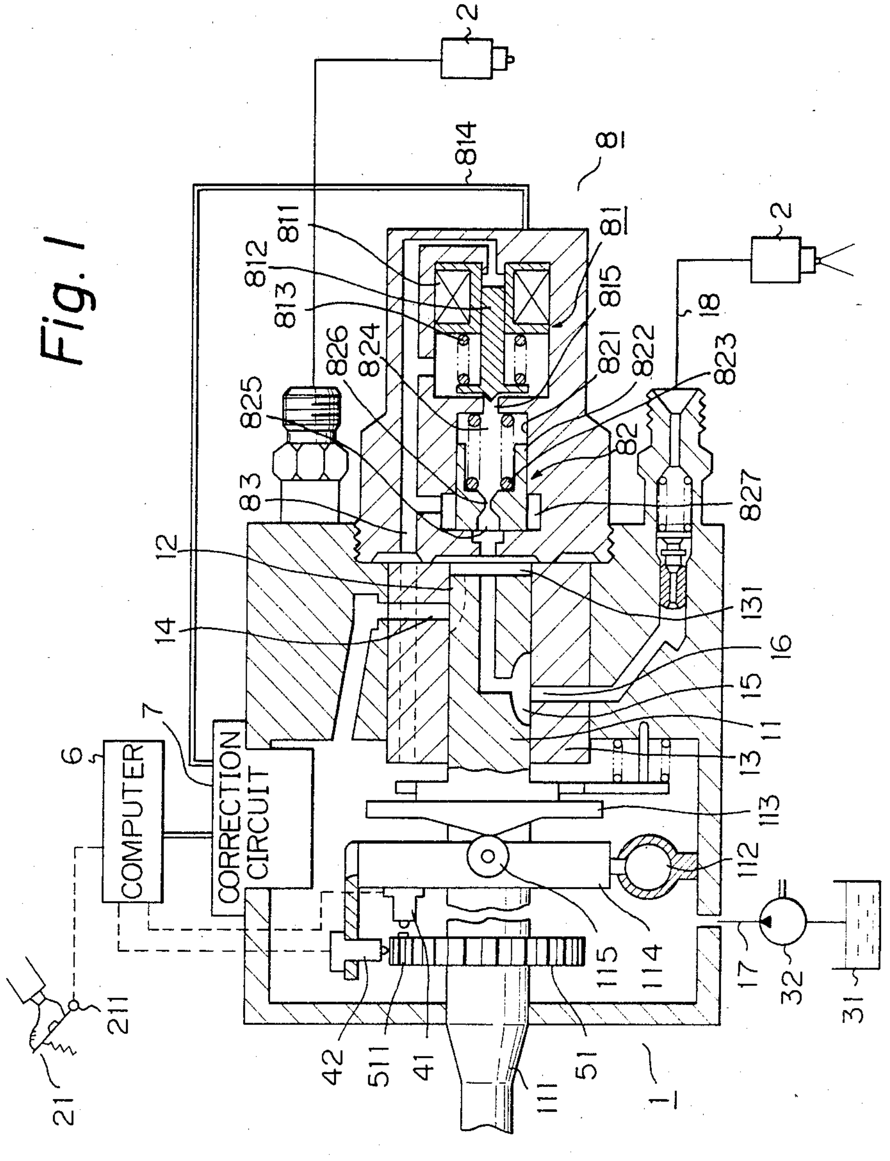
FIG. 1 shows a system for control of the amount of fuel to be injected in an internal combustion engine according to an embodiment of the present invention.

A system for control of the amount of fuel to be injected in an internal combustion engine according to an embodiment of the present invention is shown in FIG. 1. The system shown in FIG. 1 includes a high pressure pump 1 of, for example, the distribution type.

The plunger 11 of the high pressure pump 1 is driven rotationally and reciprocally by the driving shaft 111 rotating at half rotational speed in synchronization with the engine rotation. In the suction stroke, at which the first slot 12 of the plunger 11 communicates with the suction port 14 of the cylinder 13, the plunger 11 is moved to the left, as seen in FIG. 1, to draw fuel into the pressure chamber 131 formed by the cylinder 13 and the top of the plunger 11.

In the exhaust stroke, in which the second slot 15 of the plunger 11 communicates with the exhaust port 16 of the cylinder 13, the plunger 11 is moved to the right, as seen in FIG. 1, to exhaust the fuel from the pressure chamber 131 through the slot 15 and the exhaust port 16 to the high-pressure path 18. The timing of the start of the fuel injection depends on the timing of the start of the rightward movement of the plunger 11. The change of the fuel injection timing is usually carried out by a device 112 called the timer.

The timer 112 causes the roller ring 114 to rotate, and the reciprocal movement of the plunger 11 is caused by the motion of the face cam 113 when riding against the roller 115 of the roller ring 114. Hence, the timing of the start of the fuel injection can be changed by changing the phase-relationship between the roller 115 and the face cam 113.

The fuel control valve mechanism 8 includes a solenoid valve 81 as the electromagnetic valve and a spool valve 82 as the oil-pressure valve. The spool valve 82 includes a cylinder 821, a spool 822, and a spring 823. The spool 822 is adapted to slide to the left or right, as seen in FIG. 1, in the cylinder 821. The oil-pressure chambers 825 and 824 are provided at the left and right ends of the cylinder 821.

The left oil-pressure chamber 825 communicates directly with the pressure chamber 131, and with the right oil-pressure chamber 824 through a throat 826 provided at the central axis portion of the spool 822. A spring 823 is provided in the right oil-pressure chamber 824, and the force of the spring 823 presses the spool 822 to the left. When the oil pressure in the left oil-pressure chamber 825 is sufficiently greater than the oil pressure in the right oil-pressure chamber 824, the spool 822 is moved to the right against the force of the spring 823. When the left end of the spool 822 reaches the ring slot 827, as a result of the above-described movement, the oil-pressure in the left oil-pressure chamber is relieved through the ring slot 827 to the drain path 83.

The communication between the right oil-pressure chamber 824 with the drain path 83 is open or closed by the solenoid valve 81. The solenoid valve 81 includes a solenoid 811, a valve body 812, a small hole 815, and a sping 813. When the solenoid 811 is energized, the valve body 812 is moved to the right against the force of the spring 813 so that the small hole 815 is open. When the solenoid valve 81 is opened, the oil-pressure in the oil-pressure chamber 824 is relieved to the drain path 83. The solenoid 811 is energized through a lead line 814 by the controlling device including a computer. The fuel is supplied through a low pressure path 17 by a feed pump 32 from a fuel tank 31.

Figure 2A:
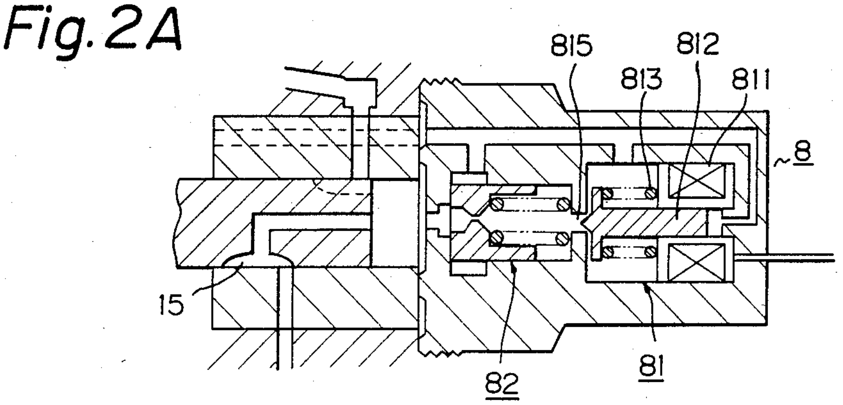
FIGS. 2A, 2B, and 2C illustrate the fundamental operation of a fuel control valve mechanism in the system shown in FIG. 1.

The operation of the fuel control valve mechanism 8 will be explained with reference to FIGS. 2A, 2B, and 2C. During the stoppage of the relieving operation, that is, at the start of the fuel injection and during the fuel injection, as shown in FIG. 2A, the energization of the solenoid 811 is stopped, and the valve body 812 is pressed to the left by the force of the spring 813, closing the small hole 815. Hence, all of the relieving paths of the solenoid valve 8 are closed and thus the fuel is supplied through the slot 15 to the fuel injection nozzle 2.

Figure 2B:
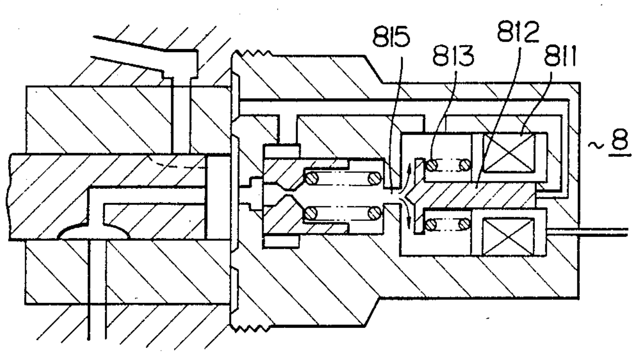

At the start of the relieving operation, that is at the termination of the fuel injection, as shown in FIG. 2B, the solenoid 811 is energized, and the valve body, which has closed the small hole 815, is pressed to the right to start the relieving operation.

Figure 2C:
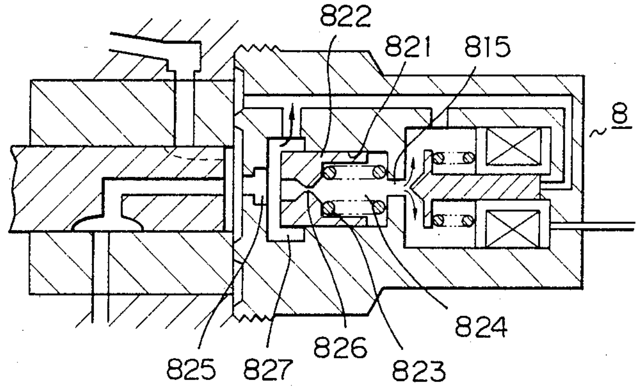
Figure 3:
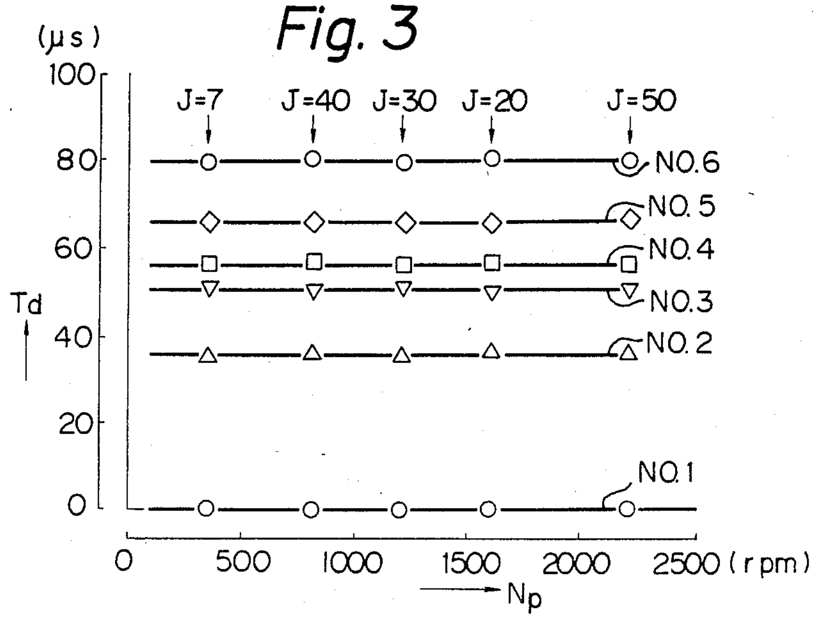
FIGS. 3 and 4 illustrate the operation characteristic of the system shown in FIG. 1.

When the small hole 815 is opened, as illustrated in FIG. 2C, the pressure in the right oil-pressure chamber 824 is reduced, and the spool 822 is pressed to the right against the force of the spring 823. As a result, when the left oil-pressure chamber 825 is communicated with the ring slot 827 of the cylinder 821, the main relieving operation is carried out.

The energization of the solenoid 811 of the solenoid valve 81 is carried out by the computer 6 as follows. The computer 6 energizes the solenoid 811 at the appropriate timing and during the appropriate time-length, based on the signal representing the opening degree of the accelerator and the pump rotational speed. The signal representing the opening degree of the accelerator is delivered from the potentiometer 211 associated with the accelerator pedal 21. The signal representing the rotational phase of the engine corresponding to the pump rotational speed and timing is delivered from the two magnetic resistance element type sensors 41 and 42 provided in the roller ring 114.

The sensors 41 and 42 are fixed to the roller ring 114 and detect the projections or recesses of the toothed wheel 51 which rotates together with the drive shaft 111. The sensor 41 detects the single projection 511 provided at the side adjacent to the circumference of the toothed wheel 51. The sensor 42 detects the projections and recesses of the toothwheel arranged at intervals of 5 degrees. The computer 6 calculates the timing of the start of the spill based on the signals from the sensors 41 and 42, and energizes the solenoid 811 accordingly. Thus, the fuel injection amount is decided in accordance with the timing of the start of the energization of the solenoid 811. In the fuel injection pump with four cylinders, the energizations of the solenoid are carried out four times, and the fuel injection with the suitable fuel injection amount is carried out by the fuel injection nozzles 2 of the cylinders.

Figure 4:
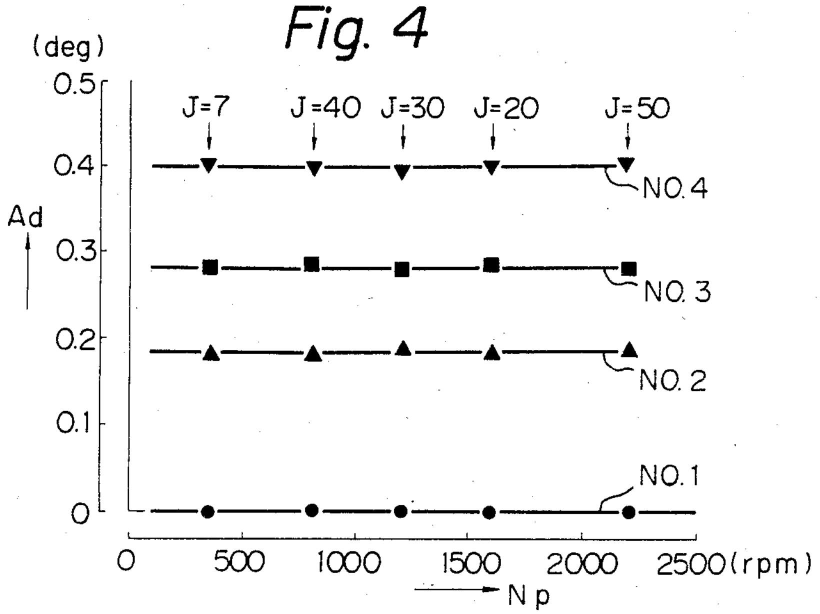

The present invention is based on the following fact. That is, as a result of the mass-production of internal combustion engines, the control response characteristic of the fuel control valve mechanism 8 varies between the produced engines, and hence, the fuel injection amount varies between the produced engines. According to the results of experiments carried out by the present inventors, the response characteristic of the fuel control valve mechanism 8 is such that an approximately constant time-delay $T_d$ (μs) occurs regardless of the pump rotational speed $N_p$ (rpm) and the fuel injection amount J ($mm^3$/st) in each of the fuel control valve mechanisms. From this viewpoint, a predetermined delay time is added by the computer 6 to the energization control period, such as the energization start timing or the energization termination timing, for the fuel control valve mechanism for the spill, to make the response delays of the fuel control valve mechanisms all the same. By adding such a predetermined delay time, the timing of the fuel spill is corrected with a predetermined time, and the response delays of the entire fuel control valve mechanisms are made constant; accordingly, it is possible to make the fuel injection amounts all the same.

Where the above-described system is applied to a multiple-cylinder engine, when the spill start signals for plural cylinders are delivered at the same angle, the amounts of fuel injection are varied. As shown in FIG. 4, and based on the result of experiments carried out by the inventors, it can be seen that an approximately constant delay angle $A_d$ (deg) occurs in plural cylinders, regardless of the pump rotational speed $N_p$ (rpm) and the fuel injection amount J ($mm^3$/st). Accordingly, it was found that, by adding a predetermined delay angle to the energization control period, such as the energization start timing or the energization termination timing, for the fuel control valve mechanism for the spill to effect angle correction to the spill start timing for each of the cylinders, it is possible to correct the variations in the fuel injection amounts of the plural cylinders easily and with a high precision.

The structure of the computer 6 and the correction circuit 7 will now be described with reference to FIG. 5. The correction circuit 7 is provided in each of the fuel injection pumps 1; since the above-described variation correction must be carried out for each of the fuel control valve mechanisms 8 and for each of the fuel injection pumps 1.

The computer 6 includes an analog-to-digital conversion circuit 601, an input interface circuit 602, an input interface circuit 603, a CPU 604, a ROM 605, a RAM 606, a bus line 607, an output interface circuit 608, and a solenoid energizing circuit 609. The analog-to-digital conversion circuit 601 receives a signal from the potentiometer 211 associated with the accelerator pedal 21. The input interface circuit 602 receives signals from the reference position sensor 41 and the angle sensor 42. The input interface circuit 603 receives signals from the response delay time selection switch 701 and the variation correction switches 702 to 705 for the plural cylinders. The output of the solenoid energizing circuit 609 is supplied to the solenoid 811 of the solenoid valve 81.

The switch 701 selects the time Δt for correcting the response delay time of the solenoid. The switches 702 to 705 select the angles $\Delta\theta_i$ for correcting the variations in the fuel injection amounts of the plural cylinders due to the phase deviation of the face cam.

The operation of the computer 6 and the correction circuit 7 will now be described with reference to the flowchart shown in FIG. 6 and the time chart shown in FIG. 7. In the time chart shown in FIG. 7, the following signals are illustrated: (1) reference position signal, (2) angle signal, (3) interruption signal, (4) signal for energization start before correction, (5) number of angle pulses, (6) time term, (7) energization signal.

Figure 6:
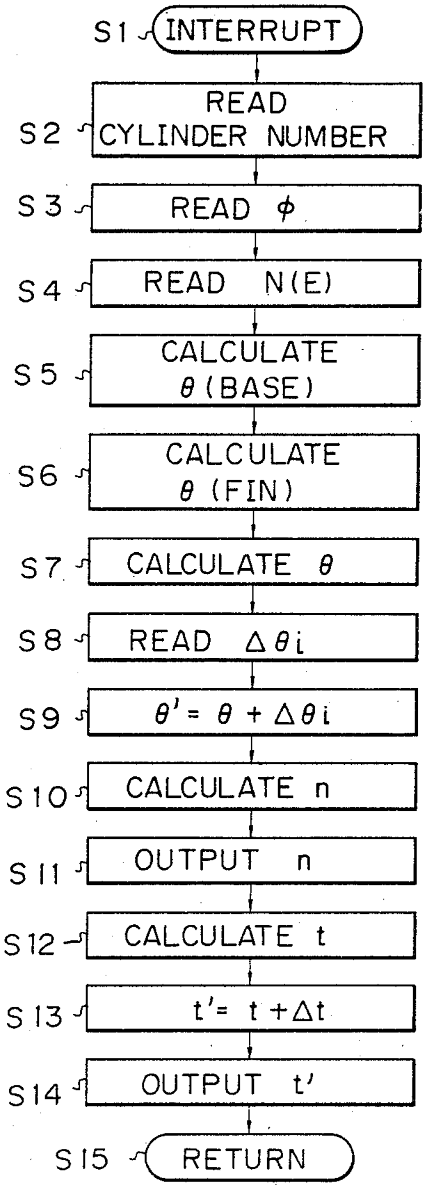
FIG. 6 is a flowchart of the operation of the computer shown in FIG. 5.
Figure 7:
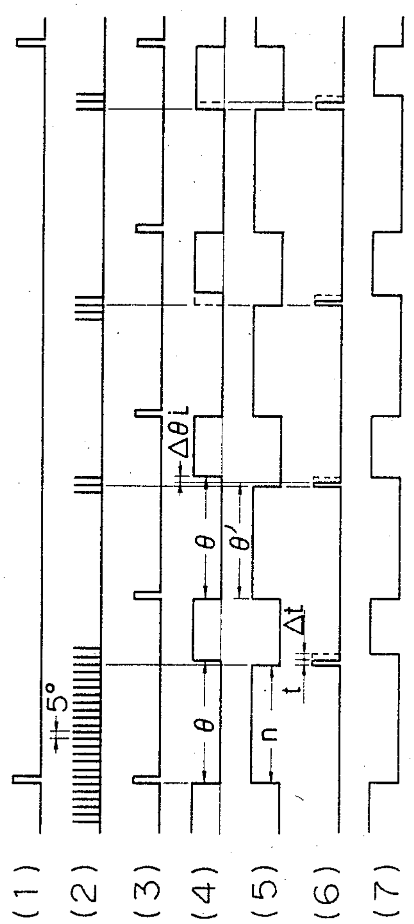
FIG. 7 illustrates the waveforms of signals appearing in the portions of the computer shown in FIG. 5.

The routine illustrated in FIG. 6 is started at step S1 by the interruption signal for each of the cylinders, as shown in FIG. 7 (3). The cylinder number of the cylinder in question is read in step S2; the opening degree φ of the accelerator is read in step S3; and the engine rotational speed N(E) is read in step S4. The fundamental fuel injection amount θ (BASE) is calculated according to the map stored in the ROM 605, based on the read φ and the read N(E), in step S5.

The final fuel injection amount θ (FIN) is calculated by effecting correction corresponding to the coolant water temperature or the like on θ (BASE) in step S6. The energization start timing θ for the solenoid is calculated according to the map stored in the ROM 605, based on the calculated θ (FIN) and the engine rotational speed N(E), in step S7.

The corrected energization start timing θ' is calculated by adding the variation correction amount $\Delta\theta_i$ for the cylinder number i to the calculated θ, as illustrated in FIG. 7 (4), in steps S8 and S9.

To attain a resolution of less than 5 degrees, the calculated θ' is divided by 5 degrees to obtain the angle pulse number n as the quotient in step S10. The data of the obtained n is supplied to a main counter in the output interface circuit 608, as illustrated in FIG. 7 (5), in step S11.

The remainder angle is converted into the time term t based on the engine rotational speed N(E) in step S12. The response delay time correction value Δt is added to the converted time term t to obtain the value t', as illustrated in FIG. 7 (6), in step S13. The data of the obtained t' is supplied to a subcounter in the output interface circuit 608 in step S14. The return is carried out in step S15.

Subsequently, a solenoid energization signal is generated automatically at a predetermined timing in the output interface circuit 608, as illustrated in FIG. 7 (7), in such a manner that the fuel injection amount is controlled through the energization circuit 609. The above-described process is carried out for each of the cylinders. One cycle is completed with a sequence of four completions of the above-described process for an engine with four cylinders.

The method of the above-described selection of the correction amount will be explained. First, a solenoid valve to be tested is fixed to a master pump having a known operating characteristic and a master nozzle having a known operating characteristic, to select the response delay time Δt of the solenoid. The response delay time Δt is selected in such a manner that a predetermined fuel injection amount is obtained when the device is operated at a condition corresponding to a predetermined engine rotational speed and engine load, and that the variation correction is zero at this moment.

Thus, the response delay time is selected, and the selected response delay time is indicated by marking the solenoid valve.

Next, the above-mentioned solenoid is fixed to a mass-produced pump and the above-mentioned master nozzle is connected to the pump. The selected response delay time marked on the solenoid valve is applied to the correction circuit. Accordingly, the variation in the response delay time is corrected so that the variation in the response time of the device using the mass-produced pump becomes the same as the device using the master pump.

Then the pump is operated at a predetermined engine rotational speed and engine load, and the variation correction value is selected in such a manner that the fuel injection amounts in the cylinders become predetermined values. Thus, the selection of the variation correction value is completed.

The correction circuit is provided at the pump side for the following reasons. If the correction circuit is provided at the computer side, the characteristics of a combination of a pump and a computer become different when a defective pump or solenoid valve is replaced by a new pump or solenoid. In this case, the variation correction value becomes meaningless for the computer when combined with the different pump. The re-selection of the variation correction values requires the above-described special equipment and, hence, can be made only at the factory. Of course, no problem will arise for the device in which the variation correction value is provided at the pump side.

Also, since the selected response delay time is marked on the solenoid valve, the application of the selected response delay time marked on the solenoid valve to the correction circuit of the newly combined pump is easily carried out by a replacement of only the solenoid valve.

In the above-described embodiment, both the addition of the delay time to the energization start or termination timing for eliminating the variation in the response characteristics of the fuel control valves for spill, and the addition of the delay angle to the energization start or termination timing for eliminating the variation in the fuel injection amounts of the cylinders are carried out. However, it is possible to carry out only the former, i.e., only the addition of the delay time to the energization start or termination timing for eliminating the variation in the response characteristics of the fuel control valves for spill. In this case, only a digital switch for the addition of the delay time need be provided in the correction circuit.

Figure 8:
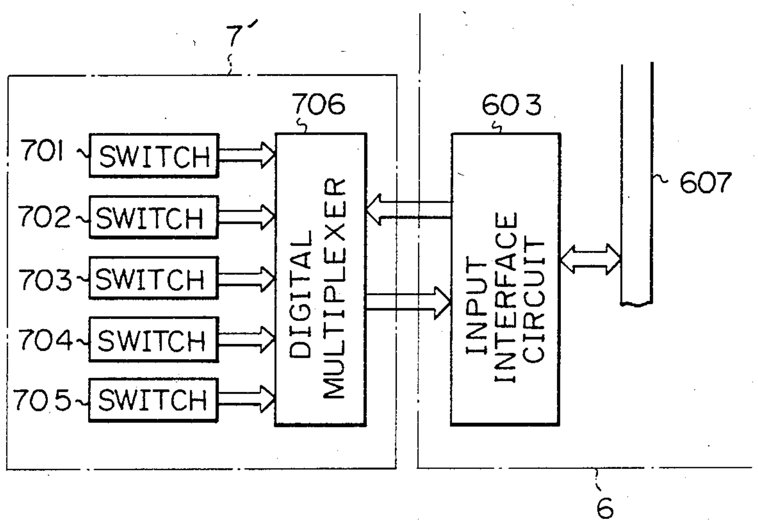
FIGS. 8 and 9 show other examples of the correction circuit in the system shown in FIG. 1.

As another embodiment of the present invention, it is possible to use the correction circuit 7' illustrated in FIG. 8. The correction circuit 7' includes a switch 701 for selecting the response delay time, and switches 702 to 705 for selecting the variation correction for the cylinders. The signals from the selection switches 701 to 705 are supplied to the input interface circuit 603 through a digital multiplexer 706. Address signals are supplied from the input interface circuit 603 to the multiplexer 706. The data of any of the selection switches 701 to 705 can be transmitted to the input interface circuit 603 by these address signals. Only 10 signal transmission lines, consisting of 3 address signal transmission lines and 7 data signal transmission lines, are required in the circuit shown in FIG. 8.

Figure 5:
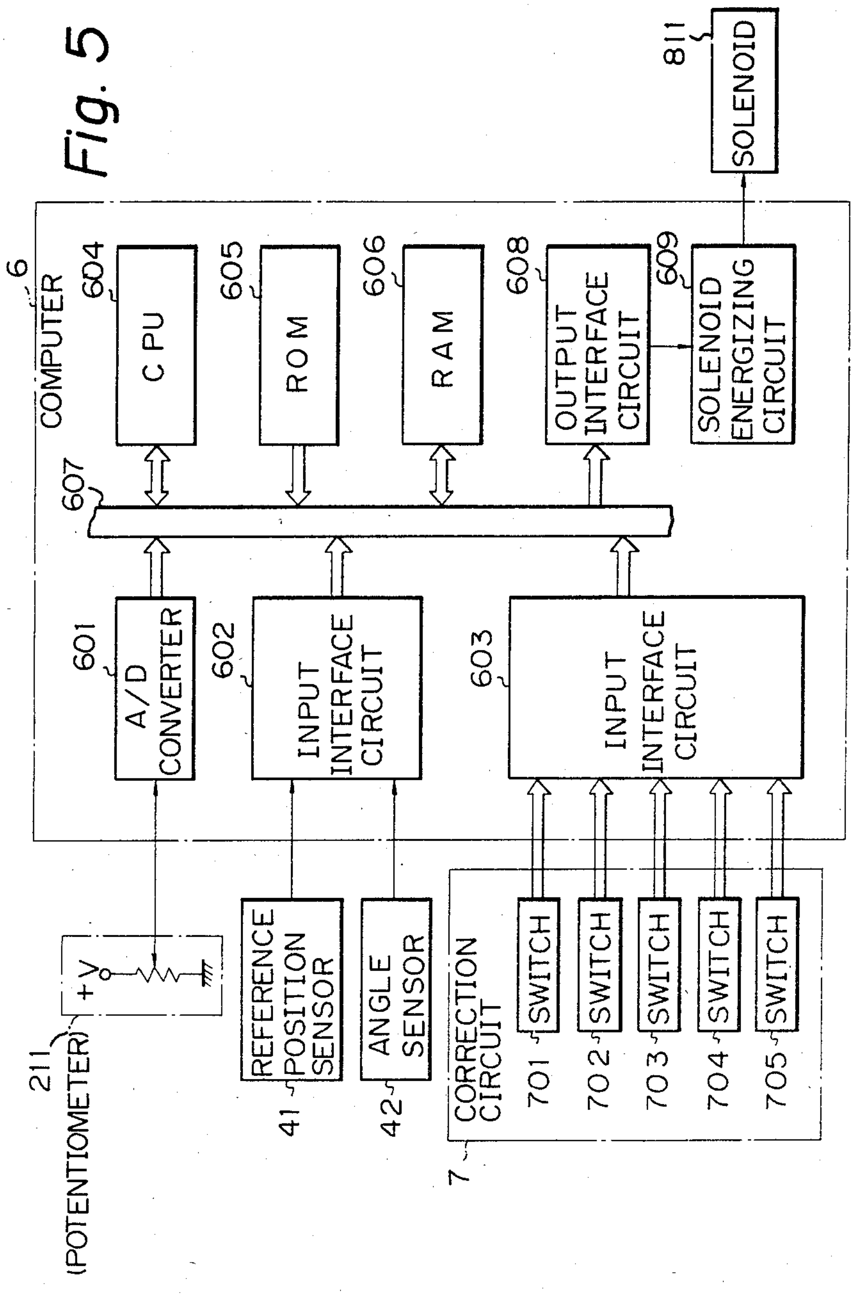
FIG. 5 shows the structures of the computer and the correction circuit in the system shown in FIG. 1.

It should be noted that, conversely, 23 signal transmission lines are required in the device shown in FIG. 5. The 23 signal transmission lines consist of 7 lines for the selection of the response delay time under the condition that the correction range is 100 μs and the resolution is 1 μs, and 16 (=4×4) lines for the selection of the delay angle under the condition that the range of variation correction for the cylinders is 10 degrees and the resolution is 0.1 degree. Thus, the correction circuit 7' shown in FIG. 8 has an advantage over the correction circuit 7 shown in FIG. 5 in that the number of signal transmission lines is reduced.

Figure 9:
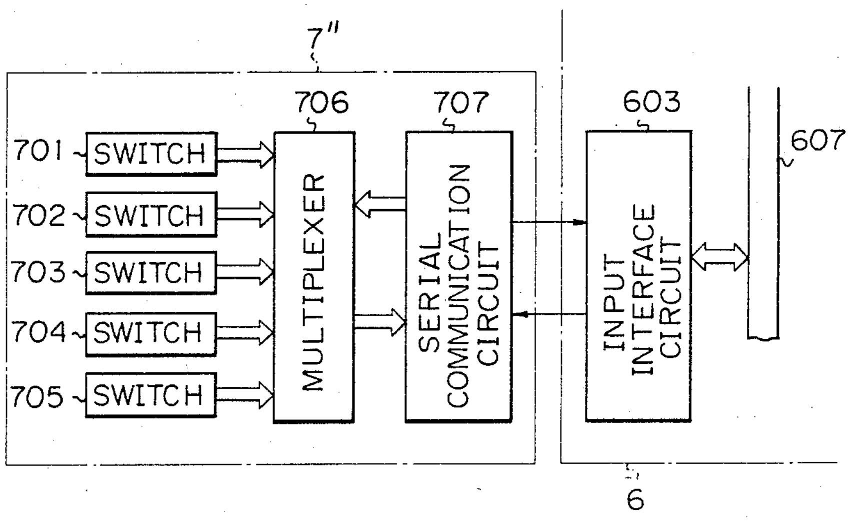

As another embodiment of the present invention, it is possible to use the correction circuit 7'' illustrated in FIG. 9. The correction circuit 7'' futher includes a serial communication circuit 707 connected between the multiplexer 706 and the input interface circuit 603. Only 2 signal transmission lines are required in the circuit shown in FIG. 9.

As another embodiment of the present invention, it is possible to adopt fuel control valve mechanisms using a magnetostrictive element or piezoelectric element, instead of the fuel control valve mechanism using the solenoid valve shown in FIG. 1.

It should be noted that, in the above-described embodiments, the variation correction is carried out by adding the correction of a predetermined time or a predetermined angle to the energization start timing of the solenoid valve, since the fuel control valve mechanism is of the normally-closed type. If a fuel control valve mechanism is of the normally-open type, the addition of at least a predetermined time or a predetermined angle to the energization termination timing is necessary, since the energization termination timing is the spill start timing.

We claim:

1. A system for controlling the amount of fuel to be injected in an internal combustion engine comprising:
  - a high-pressure pump;
  - means for spilling fuel from said pump including a spill valve and an electromagnetic valve controlling said spill valve;
  - correction means for supplying a correction signal related to preliminarily measured variations in said spilling means from other spilling means of same construction; and
  - processing means for: (1) determining a standard timing for operating said electromagnetic valve based upon engine operating conditions and independent of said variations, (2) modifying said standard timing by said correction signal to generate a control timing specifically adjusted for said spilling means and (3) generating an electric signal in response to said control timing, said electronmagnetic value operating in response to said electric signal so that said spilling means operates at a desired time independent of said variations in said spilling means.

2. A system according to claim 1 wherein said correction means is provided in said pump.

3. A system for controlling the amount of fuel to be injected in an internal combustion engine comprising:
  - a high-pressure pump;
  - means for distributing fuel from said pump to a plurality of cylinders of said engine;
  - means for spilling fuel from said pump including a spill valve and an electromagnetic valve controlling said spill valve;
  - correction means for supplying correction signals related to both preliminarily measured variations in said spilling means from other spilling means of same construction and unique variations in delay associated with each of said cylinders; and
  - processing means for: (1) determining a standard timing for operating said electronmagnetic valve based upon engine operating conditions and independent of said variations (2) modifying said standard timing by said correction signals to generate control timings specifically adjusted for both said spilling means and particular ones of said cylinder and (3) generating electric signals in response to said control timings, said electro-magnetic valve operating in response to said electric signals so that said spilling means operates at a desired time independent of said variations in said spilling means and fuel is provided to said cylinders at a time independent of said variations in delay associated with each of said cylinders.

4. A systems according to claim 3 wherein said correction means is disposed in said pump.

* * * * *